United States Patent [19]

Carlomagno

[11] Patent Number: 4,661,305
[45] Date of Patent: Apr. 28, 1987

[54] METHOD OF MARKING A SUBSTRATE USING A MARKABLE THERMOCHROMIC ARTICLE

[75] Inventor: William D. Carlomagno, Redwood City, Calif.

[73] Assignee: Raychem Corporation, Menlo Park, Calif.

[21] Appl. No.: 692,311

[22] Filed: Jan. 15, 1985

Related U.S. Application Data

[60] Division of Ser. No. 470,082, Feb. 28, 1983, abandoned, which is a continuation of Ser. No. 171,278, Jul. 23, 1980, abandoned.

[51] Int. Cl.$^4$ .................. B32B 33/00; B32B 35/00
[52] U.S. Cl. .................... 264/132; 101/426; 156/85; 156/277; 264/230
[58] Field of Search ............ 436/2, 56, 147, 164; 422/61, 56, 58, 57, 55; 116/206, 207, 216, 217; 374/162, 161; 252/962; 264/132, 230; 156/85, 277

[56] References Cited

U.S. PATENT DOCUMENTS

| | | | |
|---|---|---|---|
| 1,692,012 | 11/1928 | Wells | 436/2 X |
| 2,637,657 | 5/1953 | Ozols | 436/2 X |
| 2,889,799 | 6/1959 | Korpman . | |
| 3,445,291 | 5/1969 | Stein | 436/2 X |
| 3,616,898 | 11/1971 | Massie . | |
| 3,678,141 | 7/1972 | Metcalfe et al. | 264/73 X |
| 3,816,335 | 6/1974 | Evans . | |
| 3,894,731 | 7/1975 | Evans | 264/230 X |
| 4,032,010 | 6/1977 | Evans | 264/230 X |
| 4,105,583 | 8/1978 | Glover et al. . | |
| 4,121,011 | 10/1978 | Glover et al. | 116/207 X |
| 4,344,909 | 8/1982 | DeBlauwe | 422/61 X |
| 4,424,990 | 1/1984 | White et al. | 436/2 X |

FOREIGN PATENT DOCUMENTS

| | | |
|---|---|---|
| 2094367 | 1/1972 | France . |
| 2299972 | 2/1975 | France . |
| 2267358 | 4/1975 | France . |
| 1438765 | 6/1976 | United Kingdom . |
| 1519266 | 7/1978 | United Kingdom . |
| 1522174 | 8/1978 | United Kingdom . |

*Primary Examiner*—Arnold Turk
*Attorney, Agent, or Firm*—Sheldon & Mak

[57] ABSTRACT

An article which in use is heated to an elevated utilization temperature comprises a thermochromic composition, which when heated to a transition temperature, provides a visible color change in less than about 5 seconds. The transition temperature is at least 30° C. greater than the utilization temperature. To place visible indicia on the article, the article is heated to a temperature at least as great as the transistion temperature.

33 Claims, No Drawings

METHOD OF MARKING A SUBSTRATE USING A MARKABLE THERMOCHROMIC ARTICLE

This application is a division of application Ser. No. 470,082 filed Feb. 28, 1983, now abandoned, which is a continuation of application Ser. No. 171,278 filed July 23, 1980, now abandoned.

BACKGROUND

The present invention is directed to articles and methods for permanently marking substrates.

With the advent of highly sophisticated and correspondingly complex electrical and electronic systems, a need has arisen for the detailed labeling of the individual wires and cables present in such systems to aid in the assembly, repair and/or subsequent alteration of the electrical or electronic device. As a result of this need, flexible, heat recoverable, polymeric marker sleeves have been developed which are either color coded or include printed indicia for identification of a specific wire. These sleeves are then positioned over the conductor and held by a variety of methods. The sleeves are then heated to recover them onto the conductor so that the conductor is permanently marked.

A variety of methods are available for printing indicia on these sleeves. One such method is transfer ribbon marking where transfer ribbons deposit ink on the surface of the sleeve such as with a typewriter. The ink must be cured or "permatized" on the sleeve to effect a permanent mark. Curing can be effected using infrared to obtain temperatures in the order of 600° to 900° F. for about one second.

A disadvantage of transfer ribbon marking is that during the heating step, the heat-recoverable sleeves can recover to their heat-stable position. To prevent this from occurring, the unmarked sleeves are loaded onto fingers or holders extending from a continuous carrier belt such as described in U.S. Pat. Nos. 3,894,731 and 4,032,010. However, the carrier belt, and the steps of loading and unloading the sleeves from the belt significantly increase the cost of marking.

Another marking method utilizes hot-stamp foils where heat and pressure are used to transfer ink from the foil onto the sleeve. This method is very time consuming and the hot-stamp foils have a limited shelf life if not properly stored. Further, it is difficult to obtain a high-quality permanent mark with hot-stamp foils because the quality of the mark is very sensitive to heat, pressure and time during the marking operation.

A third method for marking recoverable polymeric sleeves utilizes a specially formulated ink provided as an ink jet onto the surface of the sleeve. However, the ink used has a limited shelf life and the inking system is expensive. Furthermore, the marks produced with these inks have only limited solvent and abrasion resistance.

In view of these problems with conventional marking methods, it is apparent that there is a need for a system for permanently, economically, and reproducibly marking heat-recoverable, polymeric sleeves.

SUMMARY

The present invention is directed to a system that satisfies these requirements. The system uses a heat-recoverable article, which recovers at a selected heat-recovery temperature. In use, the article is heated to an elevated utilization temperature that is at least as high as the selected heat-recovery temperature, and generally is at least 100° C. The article comprises a thermochromic composition which when heated to a transition temperature provides a visible color change in a very short time, less than about 5 seconds, preferably less than about 1 second, and more preferably less than about 0.5 second. Preferably the transition temperature is less than about 150° C. greater than the elevated utilization temperature so that when the article is heated to the transition temperature, little if any heat-recovery of the article occurs. The transition temperature is at least about 30° C., more preferably at least about 70° C., greater than the elevated utilization temperature, so that when the article is heated in use, the color of the thermochromic composition remains substantially unchanged.

In use, visible indicia are formed on the article by heating only selected portions of the article to at least the transition temperature for less than 5 seconds. The article is recovered on a substrate, such as a conductor, by being heated to the heat-recovery temperature.

Preferably the color change is substantially irreversible so that indicia formed on the article are permanent. The thermochromic composition can be carried on the surface of the article, or can be dispersed within the article. Preferably the thermochromic composition is dispersed in the article to insure that markings cannot be removed by abrasion or solvents.

The present invention provides a method for permanently marking substrates, where the marking medium is an integral part of a heat-recoverable article. Marking can be done quickly and economically. Further, the cumbersome and expensive support system required for transfer ribbon marking is eliminated.

The present invention is not limited to heat-recoverable articles. It has general application whenever an article is heated to an elevated utilization temperature in use. The article is provided with a thermochromic composition which when heated to a transition temperature provides a visible color change in less than about 5 seconds. The transition temperature is at least about 30° C. greater than the elevated utilization temperature.

These and other features, aspects, advantages of the present invention will become better understood with reference to the following description and appended claims.

DESCRIPTION

The present invention provides the first dependable and economical permanent marking system for heat-recoverable articles, where the system eliminates the need for a restraint to prevent recovery of the article during the printing operation. An article according to the present invention recovers at a selected heat-recovery temperature and in use is heated to an elevated utilization temperature that is at least as high as the selected heat-recovery temperature, and that generally is at least 100° C. The article comprises a thermochromic composition which when heated to a transition temperature provides a substantially irreversible, visible color change in a sufficiently short time, generally less than about 5 seconds, that localized heating of the article during a printing operation produces indicia on the article without causing substantial heat-recovery of the article. The transition temperature is at least about 30° C. greater than the elevated utilization temperature so that when the article is heat-recovered in use, the color of the thermochromic composition remains substantially unchanged.

As used herein, the term "indicia" refers to any symbol formed intentionally to convey information. An indicia can be letters, arabic numerals, roman numerals, arbitrary symbols, and combinations thereof.

The "elevated utilization temperature" of an article is the maximum temperature to which it is heated in use, other than the localized heating required for forming indicia on the article. For example, the elevated utilization temperature of a heat-recoverable article is generally a temperature slightly above the heat-recovery temperature. For an article carrying a fusible material, the elevated utilization temperature generally is slightly above the fusion temperature of the fusible material. For an article carrying a heat-activatable material, the elevated utilization temperature generally is slightly above the activation temperature. For these applications, generally the elevated utilization temperature is at least 100° C.

Articles are available in the form of a heat-shrinkable tube containing a fusible insert or a heat-activatable adhesive. In use such articles are heated to a temperature substantially higher than the heat-recovery temperature to insure that the insert fuses or the adhesive is activated. The "elevated utilization temperature" of these articles is the maximum temperature to which the article is heated.

Exemplary of polymers used in the manufacture of heat-recoverable articles are polyolefins, e.g. polyethylene; copolymers of ethylene with ethylenically unsaturated monomers, e.g., ethylene/ethyl acrylate, ethylene/vinyl acetate copolymers; polyvinyl chloride; elastomers; silicones; polytetrafluoroethylene; polyvinylidene fluoride; polyurethanes; and ionomers; cross-linked where necessary or desired, either by radiation or chemical means. Those materials which can be rendered heat-recoverable below their softening point, for example polyvinyl chloride, need not but can be cross-linked, where for example, it is desired to reduce the risk of damage to the article by overheating.

The heat-recovery temperature of these polymers is generally a temperature slightly above the crystalline melting temperature of the polymer. For example, the heat-recovery temperature of low dehity polyethylene is about 110° C.; high density polyethylene about 135° C.; polyvinylidene fluoride about 175° C.; ethylene vinyl acetate co-polymers about 80°–90° C.; and ethylene acrylate co-polymers about 80°–90° C. Some polymers, such as polyvinyl chloride which are not crystalline, recover at about their glass transition temperature. The recovery temperature of polyvinyl chloride is about 80° C.

Heat-recoverable articles made from these polymers can recover in about two to three minutes when heated with a commercial heat gun.

Heat-recoverable articles are articles which have been deformed from an original dimensional state in which they are stable to heat to a deformed dimensional state in which they are unstable to heat, returning, when heated, to their original stable state. One example of such an article is a heat-shrinkable tube which remains at a certain diameter until heated to or above a certain temperature, its "recovery temperature," at which temperature it shrinks. Materials and processes suitable for the manufacture of heat-recoverable articles are given, for example, in U.S. Pat. No. 2,027,962 granted to L. M. Currie, U.S. Pat. No. 3,086,242 granted to P. M. Cook et al, and U.S. Pat. Nos. 3,243,211, 3,297,819, and 3,396,460 granted to J. D. Wetmore, the disclosures of all of which are incorporated herein by this reference.

Other articles useful in the practice of the present invention can be wrap-around sleeves, tubular end caps, bonded films and the like.

In forming polymeric heat-recoverable articles with the thermochromic composition dispersed therein, a polymeric composition comprising the thermochromic composition is heat processed such as with an extruder. When using a thermochromic composition that yields a substantially irreversible color change, it is important that the color change not occur during heat processing. To avoid such a color change, preferably the transition temperature is at least about 15° C., and more preferably at least about 20° C. higher than the heat processing temperature.

Heat processing by extrusion typically occurs at the following temperatures for polymers useful for forming heat recoverable articles:

| | |
|---|---|
| low density polyethylene | 100–250° C. |
| high density polyethylene | 170–290° C. |
| polyvinylidene fluoride | 230° C. |
| ethylene vinyl acrylate co-polymers | 95° C. |
| polyvinyl chloride | 135° C. |
| polytetra fluoroethylene | 345° C. |
| polyurethane | 125–235° C. |
| ionomers | 140–290° C. |

The present invention is not limited to use only with heat-recoverable polymeric material. It is applicable to other substrates and applications, including, for example, heat-recoverable articles made from memory metals as described in British Pat. Nos. 1,327,441 and 1,488,393, especially preconditioned alloys described in U.S. Pat. Nos. 4,436,669; 4,067,752 and 4,095,999, all five of these patents being incorporated herein by this reference. For such articles, the thermochromic composition is provided as a coating.

The heat-recoverable article can either shrink or expand when heated to its heat-recovery temperature.

The wall thickness of the article affects its performance in use. Preferably the wall thickness is at least about mils (0.005 inch) to avoid deformation of the wall during marking with indicia. Preferably the wall thickness is less than about 50 mils because such a thick wall requires excessively long times to mark. Optimumly the wall thickness is from about 8 to about 10 mils.

A variety of thermochromic compounds, i.e. compounds which change color at a transition temperature, are known. Examples of such compounds are given in an article by Jesse H. Day entitled "Thermochromism of Inorganic Compounds" in Chemical Reviews, 68, 649 (1968); U.S. patent application Ser. No. 105,587 filed Dec. 20, 1979 by DeBlauwe; U.S. Pat. No. 3,816,335 to Evans; U.S. Pat. No. 3,236,651 to Marks; U.S. Pat. No. 3,980,581 to Godsey; U.S. Pat. Nos. 4,105,583 and 4,121,011 to Glover; and an article by Cowling et al entitled "Temperature-Indicating Paint" in Industrial and Engineering Chemistry, 45, 2317 (1953), the disclosures of all of these references being incorporated herein by this reference.

The temperature of the color change or "transition temperature" of thermochromic compositions depends on the environment and the rate of heating. It is a matter of routine experiment to ascertain the transition temperature of a particular thermochromic composition.

Preferably the thermochromic composition provides a substantially irreversible color change, i.e. the thermochromic composition, once it undergoes a color change, does not revert back to its original color.

For heat-recoverable articles, the transition temperature range of interest is from about 110° to about 500° C., and preferably from about 230° to about 450° C. Preferably the color change is highly visible, such as a change from white to black, yellow to black, and the like.

Exemplary of thermochromic compositions that can be used in heat-recoverable articles are cadmium hydroxide; ammonium vanadate and mannitol; and bismuth subcarbonate and thiodipropionic acid.

The thermochromic composition changes its color in a short time so that commercially acceptable rates of marking on the article can be achieved, and so that the article does not heat-recover when localized portions of the article are heated for printing. Thus, the thermochromic composition changes color when heated to a selected transition temperature in less than 5 seconds, preferably in less than one second, and more preferably less than about 0.5 seconds. A further advantage of short printing times is that printing times in excess of about 1 second can yield fuzzy indicia.

To avoid heat-recovery of the article during printing, preferably the thermochromic composition used has a transition temperature no more than about 150° C. greater than the elevated utilization temperature of the article. To avoid changing the color of the thermochromic composition when using the article, preferably the transition temperature is at least 30° C., and more preferably at least about 70° C. greater than the elevated utilization temperature.

When the article of the present invention comprises polymeric body, best results visually are achieved when the thermochromic composition is dispersed homogeneously in the polymer by, for example, the use of a solvent common to the polymer and the composition, or by blending the composition into the polymer on a mill. Thermochromic articles can be made if the composition is only partially dispersed. Any means of incorporating the thermochromic composition into the polymer, including mixing the two materials in liquid or powder form, can be employed.

After incorporating an appropriate thermochromic composition into a polymer, the polymer can be shaped and rendered heat-recoverable by normal methods. For example, polyethylene into which has been blended a thermochromic composition can be extruded into a tube, crosslinked by radiation, and expanded to form a heat-shrinkable tube which on heating to cause recovery returns to its original size.

An advantage of incorporating a thermochromic composition into the polymer is that indicia formed are abrasion and solvent resistant.

The thermochromic composition can be a part of a coating composition applied to at least part of the surface of an article. Such a coating composition can comprise a thermochromic composition, a polymeric binder such as an acrylic resin, and an organic solvent such as a halogenated solvent. Exemplary of suitable binders include a copolymer of N-butylmethacrylate with methylmethacrylate; ethylene/vinyl acetate copolymers; ethylene/alkylacrylate copolymers; chlorinated polyethylenes; vinyl chloride homo- and co-polymers, especially vinyl acetate/vinyl chloride co-polymers which can be wholly or partially hydrolyzed; and poly-vinyl acetate, which can also be partially hydrolyzed. Other materials are suited for different applications such as for example, water-base latex paints.

The solvent used in the coating composition can be a chlorinated solvent such as 1, 1, 1-trichloroethylene.

Alternatively, the article can comprise two layers coextruded into a laminate, one or both of the layers containing the thermochromic composition. In another version of the present invention, bonded film can be used such as two pieces of film, each about 5 mils thick, bonded together with heat, with a thermochromic composition in one or both of the films.

The proportion of thermochromic composition in the article is determined by the intensity of color change effect desired, the inherent intensity of the colors exhibited by the thermochromic composition in its different states, and the translucency and thickness of the polymer. Preferably as little thermochromic composition as possible is used because the thermochromic materials tend to be more expensive than polymers and can adversely affect the physical properties and performance of the article. For an article formed of a polymeric composition with a thermochromic composition dispersed therein, it generally is sufficient to include thermochromic composition in an amount up to about 10% by weight of the polymeric composition.

In the version of the present invention where the thermochromic composition is applied as a coating to the article, the level of the thermochromic composition in the coating can vary widely, but again preferably it is minimized because of the cost involved.

Other ingredients can be added to the polymeric material used for forming an article according to the present invention. For example, a pigment such as an organic dye, e.g. Sunfast blue or Sumatra yellow, can be added for coloring purposes. Thickening agents such as fumed (e.g. Cab-O-Sil and Aerosol) can be added to improve the rheological properties. The polymeric composition can contain flame retardant, anti-oxidants, and the like.

Articles have been formed from polymeric compositions using low-density polyethylene, high-density polyethylene, polyvinylidene flouride, EVA (ethylene vinyl acetate copolymer), and EEA (ethylene/ethyl acrylate copolymer). Conventional polymeric compositions can be used merely by adding the requisite amount of thermochromic composition. The polymeric compositions used contained from about 50 to 70 percent polymer, 20 to 35 percent flame retardant, 1 to 3 percent coloring pigment, 2 to 5 percent antioxidant, and 1 to 3 percent prorad in addition to the thermochromic composition (all percentages are by weight unless indicated otherwise). The thermochromic compositions used included cadmium hydroxide in an amount of from about 2 to about 6 percent by weight; ammonium vanadate at about 5 percent by weight with mannitol as an activator in an amount of from about 1 to about 3 percent by weight; and bismuth subcarbonate in an amount of from about 0.8 to about 3.2 percent by weight with thiodipropionic acid in amount from about 1.2 to about 4.8 percent by weight.

EXAMPLES 1 AND 2

The following compositions were successfully used:

|                            | % BY WEIGHT |           |
|----------------------------|-------------|-----------|
|                            | Example 1   | Example 2 |
| Low Density Polyethylene   | 45.1        | —         |
| Ethylene Vinyl Acetate     | —           | 46.6      |
| Ethylene Propylene Rubber  | 7.9         | —         |
| Silicone                   | 2           | 1.4       |
| Flame Retardants           | 31.4        | 36.1      |
| Titanium Dioxide           | 1.4         | 1.4       |
| Antioxidants and Stabilizers | 4.8       | 5.7       |
| Prorad                     | 2.4         | 3.8       |
| Thiodipropionic Acid       | 3           | 3         |
| Bismuth Subcarbonate       | 2           | 2         |

As noted from these examples, the thermochromic composition can comprise one or more compounds, depending upon the nature of the color change at the activation temperature.

Table 1 presents thermochromic compositions suitable for use in the present invention, including their transition temperature and the color change that occures at the transition temperature.

TABLE 1

| Compound | Transition Temperature | Color Changes |
|----------|------------------------|---------------|
| $NH_4VO_3$ Ammonium Vanadate | 140–150° C. | White to Brown |
| $CoNH_4PO_4H_2O$ Cobalt Ammonium Phosphate (Shepard Violet 102) | 165–175° C. | Violet to Blue |
| $Cd(OH)_2$ Cadmium Hydroxide | 200–210° C. | White to Black |
| $Bi_2O_2CO_3$ and $S(CH_2CH_2COOH)_2$ Bismuth Subcarbonate and 3,3-thiodipropionic acid | 245–255° C. | White to Black |
| $CuCO_3.Cu(OH)_2$ Copper Carbonate | 275–280° C. | Green to Black |
| $Fe_2O_3H_2O$ Iron Oxide | 300–305° C. | Yellow to Black |

Articles of the present invention can be used for marking a substrate. To do so, visible indicia are formed on the article by heating only selected portions of the article to at least the transition temperature for less than about 5 seconds. The artible is recovered on the substrate by heating the article to the heat-recovery temperature. For ease in marking the substrate, preferably the indicia is formed on the article prior to the step of recovering the article. However, the steps of forming the indicia and recovering the article can be performed simultaneously, or the article can be recovered before the indicia is formed.

The indicia can be formed with a thermal printer, solder iron, laser, or other suitable device. A suitable thermal printer is available from Matsushita, Division of Panasonic of Japan, Part No. EUY-10T, which is a five-by-seven dot matrix scanning head. A eight-bit ASCII keyboard can be used for controlling the indicia to be placed on the articles. A logic interface is needed between the keyboard and the thermal printer. A suitable logic interface is Model No. EUD-PUD available from Matsushita.

Another suitable printer is a thick film resistance print head available from Gulton Industries, Inc. of Metuchen, N.J. under model no. C1137-24F24. It can be powered by a DC current pulse generator providing 30 volts, 9 amperes, at a pulse width of from 200 miliseconds to 1 second.

The articles of the present invention can be used in a wide variety of applications, including marking articles of circular and non-circular cross-section. For example, they can be used for marking syringes, intravenous fluid bottles, electrical wires, tubes, as identification bracelets in hospitals, marking plumbing lines, process piping, and other substrates.

The present invention is not limited to use with heat-recoverable articles. There are a variety of articles which are subject to heat processing which can also require marking. Generally, the present invention requires that the thermochromic composition used for producing indicia has an activation temperature above the utilization temperature of the article.

For example, in one version of the present invention, an article which is heated to an elevated utilization temperature in use can have a heat-activatable material such as a heat-activatable adhesive on a surface. The heat-activatable material has an activation temperature, which is no greater than the elevated utilization temperature. The article comprises a thermochromic composition so that the article can be marked. The thermochromic composition provides a substantially irreversible visible color change in less than about 5 seconds when heated to its transition temperature. To avoid changing the color of the thermochromic composition when the article is heated to activate the adhesive, the transition temperature is at least about 30° C. greater than the utilization temperature.

Another application for the present invention is an article which is heated to an elevated utilization temperature in use and which comprises a fusible material such as the sleeves described in U.S. Pat. No. 3,396,460 to Wetmore, which is incorporated herein by this reference. The fusible material can be solder or a meltable thermoplastic that fuses at a selected fusion temperature which is no greater than the elevated utilization temperature. The article comprises a thermochromic composition which when heated to a transition temperature provides a substantially irreversible color change in less than about 5 seconds. The transition temperature is at least about 30° C. greater than the elevated utilization temperature so that when the fusible material is melted, the thermochromic composition does not undergo a color change.

Articles and methods according to the present invention provide substantial advantages for marking substrates. A highly visible, abrasion-resistant, solvent-resistant mark can be produced. This can be done economically in a simple printing step, without the need for any permatizing operation. The present invention provides the first economical and efficient permanent marking system for heat-recoverable articles that eliminates the need for a restraint system.

Although the present invention has been described in considerable detail with reference to certain preferred versions thereof, other versions are possible. Therefore the spirit and scope of the appended claims should not necessarily be limited to description of the preferred versions contained herein.

What is claimed is:

1. A method for marking a substrate comprising the steps of:
    (a) placing on the substrate an article that is removable from the substrate until the article is heated to a temperature T1 of at least 100° C., the article being non-removable from the substrate when the article is heated to T1, the article having a thermochromic composition on at least a portion of a visible surface thereof, the thermochromic composition providing a substnatially irreversible visible color change in less than about 5 seconds when heated to a transition temperature T2, T2 being a sufficient amount greater than T1 that the thermochromic composition does not change color when the article is heated to T1;

(b) forming visible indicia on the article by heating only portions of the article to at least T2 for up to about 5 seconds so that only a portion of the thermochromic composition irreversibly changes color without affecting the removability of the article from the substrate; and (c) preventing the article from being removed from the substrate without changing the color of the thermochromic composition by heating substantially the entire article to at least T1 but less than T2.

2. The method of claim 1 in which the substrate is cirrcular in cross section, the article is tubular, and the indicia are visible on the exterior surface of the tubular article.

3. The method of claim 1 in which the article has a paint on the surface thereof, the paint containing the thermochromic composition.

4. The method of claim 1 in which the article is formed of a polymeric material with the thermochromic composition dispersed throughout the polymeric material.

5. The method of claim 1 in which the step of forming visible indicia is performed before the step of placing the article on the substrate.

6. The method of claim 1 in which the thermochromic composition provides a visible color change in less than about one second when heated to T2, and the step of forming visible indicia comprises heating only portions of the article to at least T2 for less than about one second.

7. The method of claim 1 in which a thermochromic composition provides a visible color change is less than about 0.5 second when heated to T2, and the step of forming visible indicia comprises heating only portions of the article to at least T2 for less than about 0.5 second.

8. The method of claim 1 in which T2 is at least 30° C. greater than T1.

9. The method of claim 8 in which T2 is at least 70° C. greater than T1.

10. A method for placing indicia on an article comprising the steps of:

(a) selecting an article that has a heat activated property that is activated at a temperature T1 of at least 100° C., the article having a thermochromic composition on at least a portion of a surface thereof, the thermochromic composition providing a visible color change in less than about 5 seconds when heated to a transition temperature T2, T2 being a sufficient amount greater than T1 that the thermochromic composition does not change color when the article is heated to T1;

(b) forming visible indicia on the article by heating only portions of the article to at least T2 for up to about 5 seconds so that only a portion of the thermochromic composition changes color without activating the heat activated property of the article; and (c) heating substantially the entire article to at least T1 but less than T2, the thermochromic composition not changing color.

11. The method of claim 10 in which the article is formed of a heat-recoverable metal having a paint on the surface thereof, the paint containing the thermochromic composition.

12. The method of claim 10 in which the article has a heat-activatable adhesive on a surface thereof, the heat-activatable adhesive being activated at T1.

13. The method of claim 10 in which the step of forming visible indicia comprising heating selected portions of the article with a thermal printer.

14. The method of claim 10 in which T2 is at least 30° C. greater than T1.

15. A method for marking a substrate comprising the steps of:

(a) placing on the substrate a heat-recoverable, tubular, polymeric article that recovers when heated to a heat-recovery temperature T1, T1 being at least 100° C., the article having a thermochromic paint comprising a thermochromic composition on at least a portion of its outer surface, the thermochromic composition providing a substantially irreversible visible color change in less than about 1 second when heated to a transition temperature T2, T2 being at least 30° C. greater than T1, the thermochromic composition not changing color when the article is heated to T1;

(b) forming visible indicia on the article by heating only portions of the article to at least T2 for up to about 1 second so that a portion of the thermochromic composition irreversibly changes color without recovering the article; and (c) recovering the article on the substrate without changing the color of the thermochromic composition by heating substantially the entire article to at least T1 but less than T2.

16. The method of claim 15 in which T2 is at least 70° C. greater than T1.

17. The method of claim 15 in which the article has a heat fusible material on a surface thereof, the heat fusible material fusing at a temperature less than T2, and wherein the step of recovering the article comprises fusing the fusible material.

18. A method for marking a substrate comprising the steps of:

(a) placing on the substrate an article that is removable from the substrate until the article is heated to a temperature T1 of at least 100° C., the article being non-removable from the substrate when the article is heated to T1, the article having a thermochromic composition on at least a portion of a visible surface thereof, the thermochromic composition providing a substantially irreversible visible color change in less than about 5 seconds when heated to a transition temperature T2, T2 being a sufficient amount greater than T1 that the thermochromic composition does not change color when the article is heated to T1;

(b) preventing the article from being removed from the substrate without changing color of the thermochromic compostion by heating substantially the entire article to at least T1 but less than T2; and (c) forming visible indicia on the article by heating only portions of the article to at least T2 for up to about 5 seconds so that only a portion of the thermochromic composition irreversibly changes color.

19. The method of claim 18 in which the substrate is circular in cross section, the article is tubular, and the indicia are visible on the exterior surface of the tubular article.

20. The method of claim 18 in which the article has a paint on the surface thereof, the paint containing the thermochromic composition.

21. the method of claim 18 in which the article is formed of polymeric material with the thermochromic composition dispersed throughout the polymeric material.

22. The method of claim 18 in which the thermochromic compostion provides a visible color change in less than about one second when heated to T2, and the step of forming visible indicia comprises heating only portions of the article to at least T2 for less than about one second.

23. The method of claim 18 in which a thermochromic compostion provides a visible color change is less than about 0.5 second when heated to T2, and the step of forming visible indicia comprises heating only portions of the article to at least T2 for less than about 0.5 second.

24. The method of claim 18 in which T2 is at least 30° C. greater than T1.

25. The method of claim 24 in which T2 is at lest 70° C. greater than T1.

26. A method for placing indicia on an article comprising the steps of:
    (a) selecting an article that has a heat activated property that is activated at a temperature T1 of at least 100° C., the article having a thermochromic composition on at least a portion of a surface thereof, the thermochromic composition providing a visible color change in less than about 5 seconds when heated to a transition temperature T2, T2 being a sufficient amount greater than T1 that the thermochromic composition does not change color when the article is heated to T1;
    (b) heating substnatially the entire article to at least T1 but less than T2, the thermochromic composition not changing color; and
    (c) forming visible indicia on the article by heating only portions of the article to at least T2 for up to about 5 seconds so that only a portion of the thermochromic composition changes color.

27. The method of claim 26 in which the article is formed of a heat-recoverable metal having a paint on the surface thereof, the paint containing the thermochromic composition.

28. The method of claim 26 in which the article has a heat-activatable adhesive on a surface thereof, the heat-activatable adhesive being activated at T1.

29. The method of claim 26 in which the step of forming visible indicia comprises heating selected portions of the article with a thermal printer.

30. The method of claim 26 in which T2 is at least 30° C. greater than T1.

31. A method for marking a substrate comprising the steps of:
    (a) placing on the substrate a heat-recoverable, tubular, polymeric article that recovers whe heated to a heat-recovery temperature T1, T1 being at least 100° C., the article having a thermochromic paint comprising a thermochromic composition on at least a portion of its outer surface, the thermochromic composition providing a substantially irreversible visible color change in less than about 1 second when heated to a transition temperature T2, T2 being at least 30° C. greater than T1, the thermochromic composition not changing color when the article is heated to T1;
    (b) recovering the article on the substrate without changing the color of the thermochromic composition by heating substantially the entire article to at least T1 but less than T2; and
    (c) forming visible indicia on the article by heating only portions of the article to at least T2 for up to about 1 second so that a portion of the thermochromic composition irreversibly changes color.

32. The method of claim 31 in which T2 is at least 70° C. greater than T1.

33. The method of claim 31 in which the article has a heat fusible material on a surface thereof, the heat fusible material fusing at a temperature less than T2, and wherein the step of recovering the article comprises fusing the fusible material.

* * * * *